United States Patent
Iwasaki et al.

(10) Patent No.: US 6,259,716 B1
(45) Date of Patent: Jul. 10, 2001

(54) MICROWAVE EXCITED GAS LASER OSCILLATOR

(75) Inventors: Yutaka Iwasaki, Mino; Shigeki Yamane, Kobe, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/238,634

(22) Filed: Jan. 28, 1999

(30) Foreign Application Priority Data

Jan. 30, 1998  (JP) ................................................ 10-018583

(51) Int. Cl.[7] .................................................. H01S 3/0975
(52) U.S. Cl. .................. 372/82; 372/55; 372/73; 372/84
(58) Field of Search .................................. 372/55–65, 69, 372/70, 73, 74, 81–84

(56) References Cited

U.S. PATENT DOCUMENTS

| | | | | |
|---|---|---|---|---|
| 4,004,249 | * | 1/1977 | Kikuchi | 372/58 |
| 4,987,577 | * | 1/1991 | Seunik et al. | 372/82 |
| 5,058,122 | * | 10/1991 | Gekat | 372/82 |
| 5,400,357 | * | 3/1995 | Suessmuth et al. | 372/82 |
| 5,606,571 | * | 2/1997 | Furuya et al. | 372/82 |
| 5,684,821 | * | 11/1997 | Murray et al. | 372/84 |
| 5,781,579 | * | 7/1998 | Choo et al. | 372/64 |

FOREIGN PATENT DOCUMENTS

| | | |
|---|---|---|
| 2-078285 | 3/1990 | (JP) . |
| 9-148663 | 6/1997 | (JP) . |
| 9-205241 | 8/1997 | (JP) . |

* cited by examiner

Primary Examiner—John D. Lee
(74) Attorney, Agent, or Firm—Wenderoth, Lind & Ponack, LLP

(57) ABSTRACT

In one discharge tube in which laser gas flows, a plurality of microwave generating units composed of microwave power sources, magnetrons and waveguides are disposed, and each magnetron oscillates intermittently by switching the drive of the microwave power source. A main controller provides a reference clock to a power source unit composed of the plurality of microwave power sources. By this reference clock, adjacent microwave power sources in the power source unit are switched and driven at a predetermined phase difference through a phase shifter. Accordingly, discharge interference in adjacent discharge areas is avoided, so that a stable laser beam output may be obtained.

6 Claims, 7 Drawing Sheets

1. Magnetron
2. Waveguide
3. Discharge tube
4. Microwave power source
5. Power source unit
6. Main controller
7. Phase shifter
10. Discharge part 1. Magnetron
2. Waveguide
3. Discharge tube
4. Microwave power source
10. Discharge part

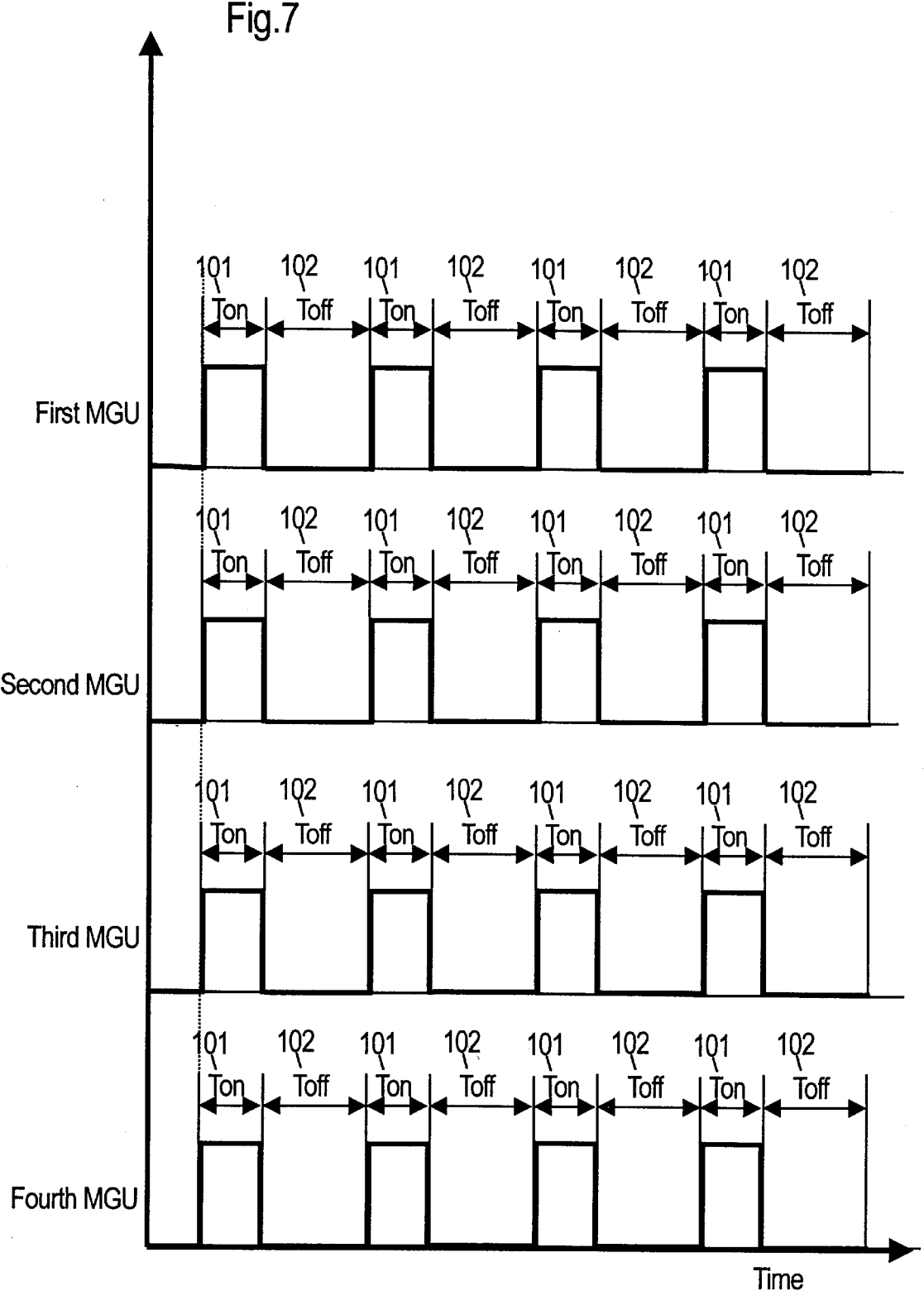

MICROWAVE EXCITED GAS LASER OSCILLATOR

FIELD OF THE INVENTION

The present invention relates to a microwave excited gas laser oscillation control method for exciting by discharging, laser gas by microwave, and a microwave excited gas laser oscillator.

BACKGROUND OF THE INVENTION

Recently, gas laser oscillators are being reduced in size. To achieve this goal, the exciting frequency for a discharging gas laser has gradually reached higher frequencies. Hitherto, to supply the frequency for such gas laser oscillation, high frequency power sources of 100 kHz to scores of megahertz have been used. However, to reduce the size, problems of price and control performance occur. To solve these problems, various studies have been made on the microwave excited gas laser oscillator (herein after called MEGLO) for exciting by discharging laser gas by microwave.

FIG. 6 is a schematic diagram for explaining a constitution of a conventional MEGLO, and it is described below while referring to the drawing.

A microwave power source (hereinafter called power source) 4 is a switching power source of about 20 kHz, and a high voltage is applied so that a magnetron 1 may produce a microwave. The microwave emitted from the magnetron 1 is injected through a waveguide 2 into a discharge area 10 which is part of a discharge tube 3 in which laser gas flows. In the discharge area 10, the laser gas is discharged and excited by the microwave. The excited and generated laser beam is amplified in a laser resonator composed of an output mirror 8 which is a partial reflector and a total reflector 9. Part of the laser beam amplified in the laser resonator is delivered outside through the output mirror 8.

As shown in FIG. 6, assuming that magnetron 1, waveguide 2 and power source 4 to be one microwave generating unit (hereinafter called MGU) 200, plural MGUs 200 are used in one discharge tube 3. Further assuming the one discharge tube 3 and a plurality of MGUs 200 compose one microwave output unit (hereinafter called MOU) 300, the number of MOUs used in one MEGLO is determined by the laser output of the MEGLO.

FIG. 7 shows an example of using four MGUs 200 in one discharge tube 3, in which four microwave output timings are shown simultaneously. As shown in FIG. 7, each MGU 200 outputs intermittently so as to issue a microwave for a period of Ton 101, and cut off for a period of Toff 102. The microwave output timings from four MGUs 200 are nearly simultaneous. In order to stabilize the microwave output, pulse-width modulation (hereinafter called PWM) control of a specific off time is effected.

In the conventional MEGLO, the output of each magnetron 1 is controlled at a specific off time by the PWM control. However, when plural MGUs 200 composing one MOU 300 are disposed closely, the microwave output of each MGU 200 is issued at the same timing as shown in FIG. 7, and the discharges in the discharge area 10 may interfere with each other. In the event of such phenomenon, the continuous output of laser beam contains ripples, and the peak output of the laser beam in pulse operation fluctuates greatly, while at the same time, the laser beam output decreases. These problems are associated with the conventional MEGLO.

SUMMARY OF THE INVENTION

The present invention is devised to solve the above problems, and it is hence an object thereof to present a small-sized MEGLO capable of delivering a continuous output of stable laser beams and a high pulse peak output. The invention for solving the problems is described below.

The MEGLO of the invention comprises plural discharge tubes for passing laser gas inside, a magnetron for generating microwaves, a waveguide for coupling the microwaves generated from the magnetron to the discharge tubes; a power source for supplying electric power to the magnetron, and a controller for controlling the power source.

One discharge tube has plural discharge areas, and each discharge area has an MGU composed of a magnetron for supplying microwaves, a waveguide and a power source.

By one discharge tube and a plurality of MGUs, one MOU is composed, and the MEGLO of the invention usually comprises a plurality of MOUs.

The plural MGUs are disposed close to each other, and the controller drives by allowing a specific phase difference among adjacent power sources.

The controller also issues a reference clock for controlling the microwave switching phase of each discharge tube to the power source of each MGU.

In this constitution, the controller issues a reference clock in every power source of each MGU, and each power source drives the corresponding MGU on the basis of the entered reference clock. For example, in the case of two adjacent MGUs, while one is issuing microwaves, the other stops issuing microwaves. Next, at the timing when the busy MGU stops output of microwaves, the other MGU issues microwaves.

In this way, the reference clock controls the switching phase of the microwaves supplied to each discharge tube. Therefore, in the case of the MEGLO of the invention, if plural MGUs are closely disposed, mutual discharge interference can be decreased, and a stable laser beam being small in ripple content may be issued.

BRIEF DESCRIPTION OF THE DRAWINGS

FIG. 7 is a diagram showing output timing of microwave output of each microwave power source in the prior art.

DESCRIPTION OF THE PREFERRED EMBODIMENT (Embodiment)

Figure 1:
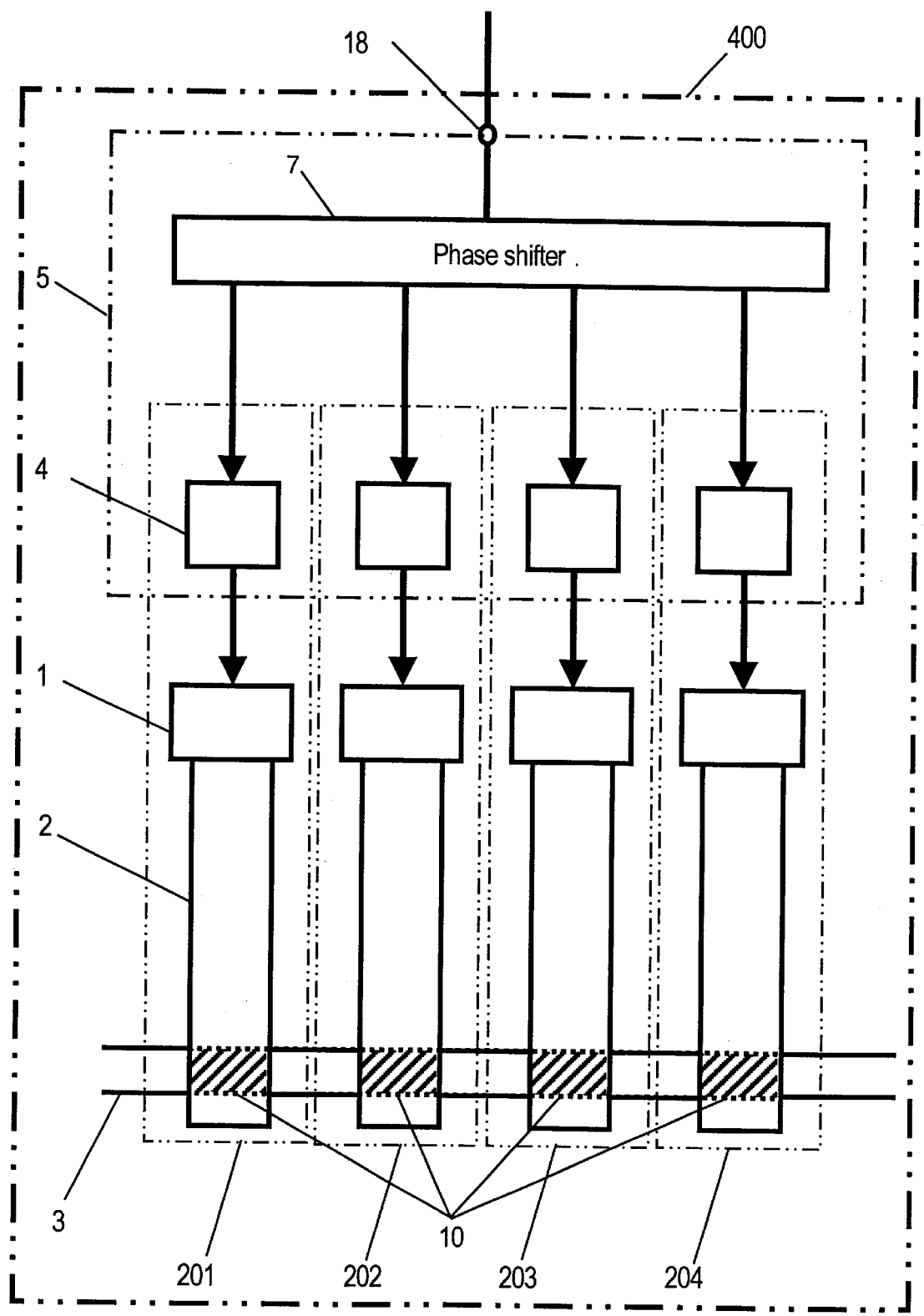
FIG. 1 is a block diagram of a microwave output unit explaining the constitution of an embodiment of a microwave excited gas laser oscillator of the invention.
Figure 2:
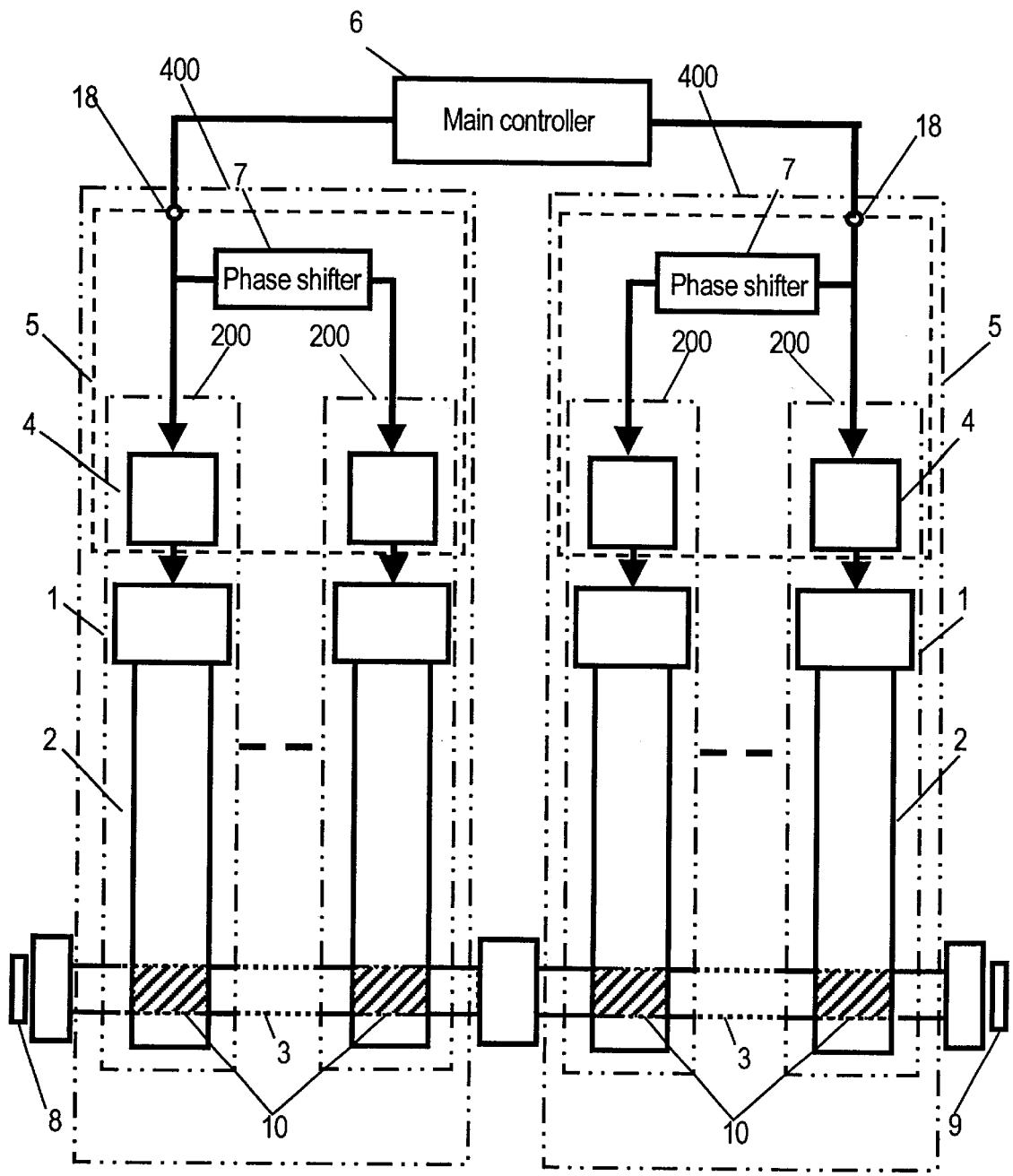
FIG. 2 is a block diagram explaining the constitution of the embodiment of the microwave excited gas laser oscillator of the invention.
Figure 6:
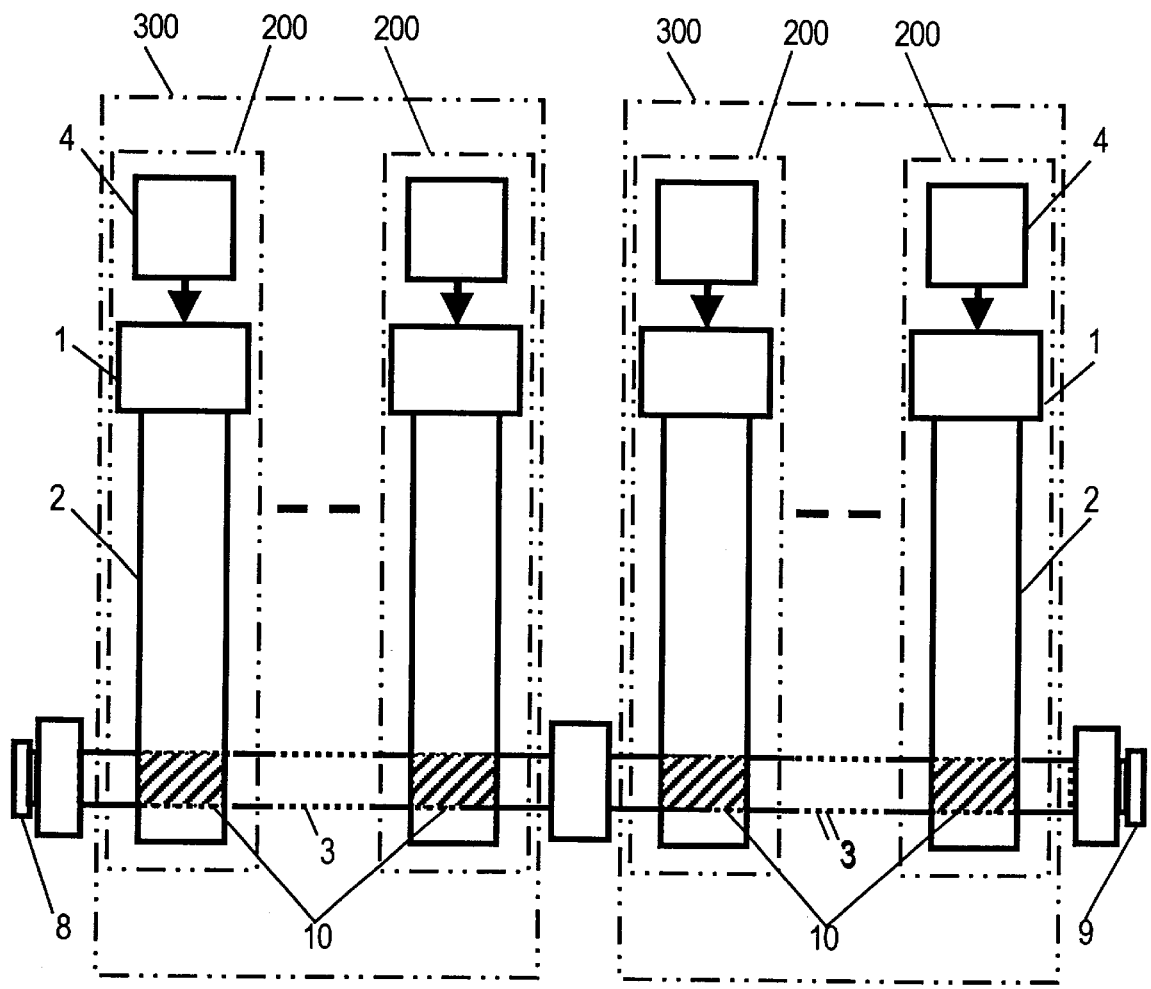
FIG. 6 is a block diagram explaining the constitution of a conventional microwave excited gas laser oscillator.

An Embodiment of a MEGLO of the invention is described below while referring to the drawings. FIG. 1 is a block diagram explaining one MOU showing the constitution of the embodiment. FIG. 2 is a block diagram of the MEGLO of the invention using a plurality of MOUs shown in FIG. 1. Same constituent elements as in the prior art in FIG. 6 are identified with same reference numerals, and their description is omitted. For simplicity of description, four MGUs are shown in FIG. 1a first MGU 201, second MGU 202, third MGU 203, and fourth MGU 204. A discharge tube 3 in which laser gas flows is inserted into a waveguide 2 for composing MGU 201, MGU 202, MGU 203, and MGU 204. In FIG. 1, four sets of closely disposed MGUs are shown as an example, but the invention is not limited to four sets. The number of MGUs used may be two sets or more for one discharge tube. Referring now to FIG. 1 and FIG. 2, the embodiment is described below.

The microwaves generated from the magnetron 1, in the discharge area 10 form a microwave glow discharge. Also, as shown in FIG. 1, each power source 4 of the plural MGUs composed in one discharge tube 3 forms one power source unit 5. The power source unit 5 has a reference clock input terminal 18 for receiving a reference clock, and also includes a phase shifter 7 for setting a phase difference of a switching phase of each power source 4. This phase shifter 7 controls the switching phase of each power source 4.

A main controller 6 shown in FIG. 2 controls the power source units 5 composed in a plurality of MOUs 400 in batch, and issues a reference clock to each power source unit 5 through each input terminal 18. A laser resonator is composed of an output mirror 8, which is a partial reflector and a total reflector 9, and a laser beam is delivered from the output mirror 8. In FIG. 2, two sets of MOUs 400 are shown, but the MEGLO of the embodiment is not limited to only two sets. A further multiplicity may be used depending on the required output of the MEGLO.

Figure 3:
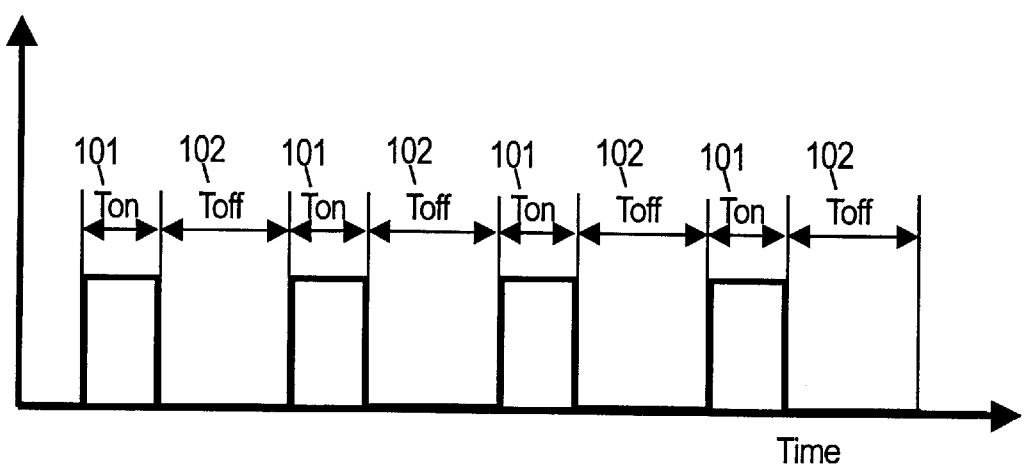
FIG. 3 is a diagram showing microwave output timing of one microwave power source.
Figure 4:
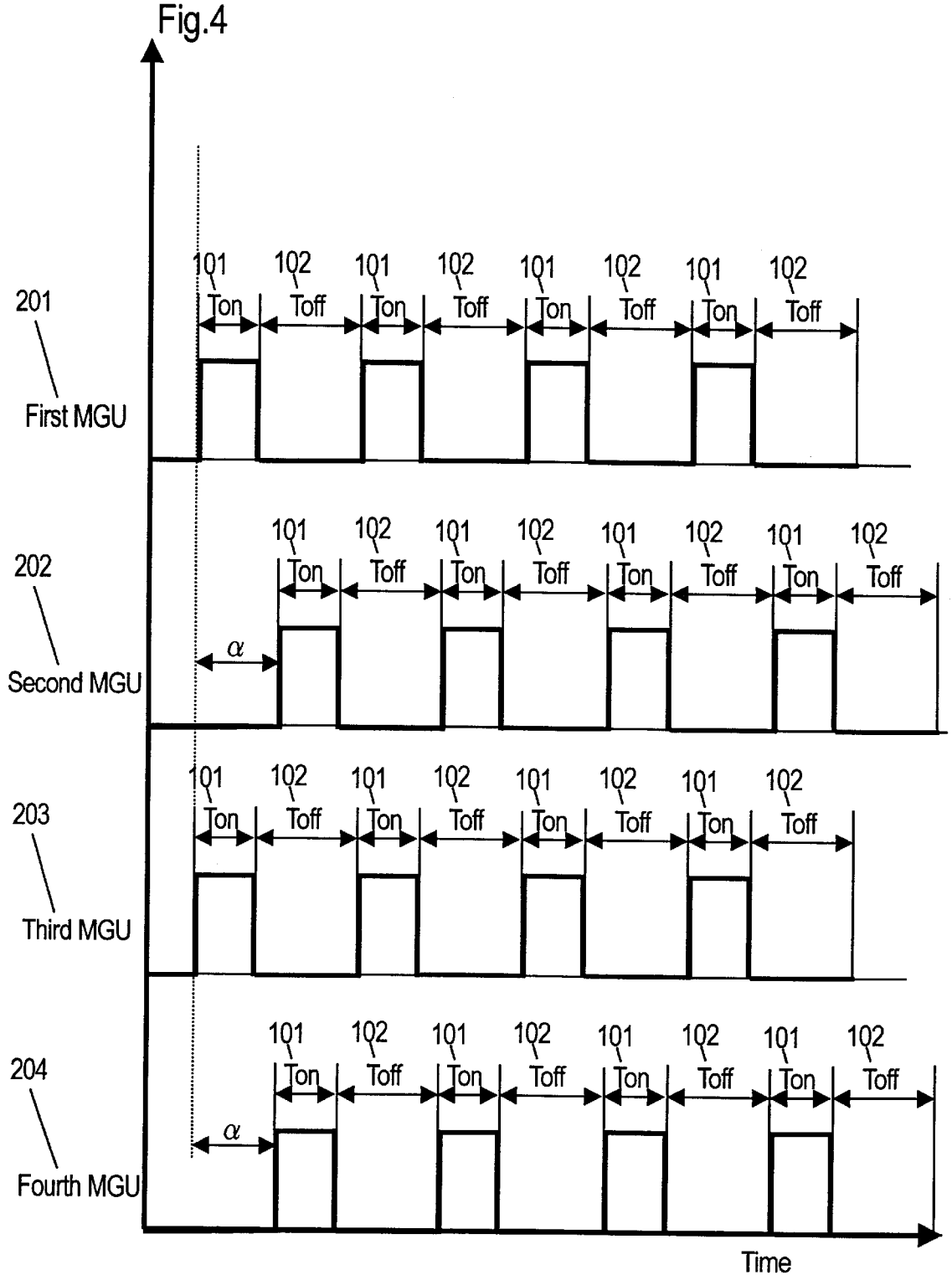
FIG. 4 is a diagram showing output timing of microwave output of each microwave power source in the embodiment of the invention.

The operation of the MEGLO in the thus constituted embodiment of the invention is described below. A reference clock of about 20 kHz is sent from the main controller 6 to each power source unit 5. Each power source 4 is switched at the frequency of this reference clock, and each magnetron 1 issues intermittent microwaves, as shown in FIG. 3 turning on for a period of Ton 101 and turning off for a period of Toff 102. In order to stabilize the microwave output, PWM control of a specific off time is effected. Its frequency is about 20 kHz. The reference clock is inputted into the power source 4 through the phase shifter 7. Then, as shown in FIG. 4, the microwave outputs of MGU 201, MGU 202, MGU 203, and MGU 204 each have a phase difference α. For example, as shown in FIG. 4, in the microwave OFF time Toff 102 between MGU 201 and MGU 203, the adjacent MGU 202 and MGU 204 issue microwaves. To the contrary, in the microwave OFF time Toff 102 between MGU 202 and MGU 204, the adjacent MGU 201 and MGU 203 issue microwaves. In this way, by keeping an appropriate phase difference in the microwave outputs of adjacent MGUs, mutual discharge interference between adjacent discharge areas 10 can be avoided. The microwave emitted from each magnetron 1 is injected into the discharge area 10, which is part of the discharge tube 3 in which laser gas flows, through each waveguide 2. In the discharge area 10, the laser gas is discharged by the microwave, and is excited. The excited and generated laser beam is amplified in the laser resonator composed of the output mirror 8 which is a partial reflector, and the total reflector 9. Part of the laser beam amplified in the laser resonator is delivered outside from the output mirror 8. As a result, mutual discharge interference of adjacent discharge areas 10 is avoided, so that a stable laser beam may be emitted.

Figure 5:
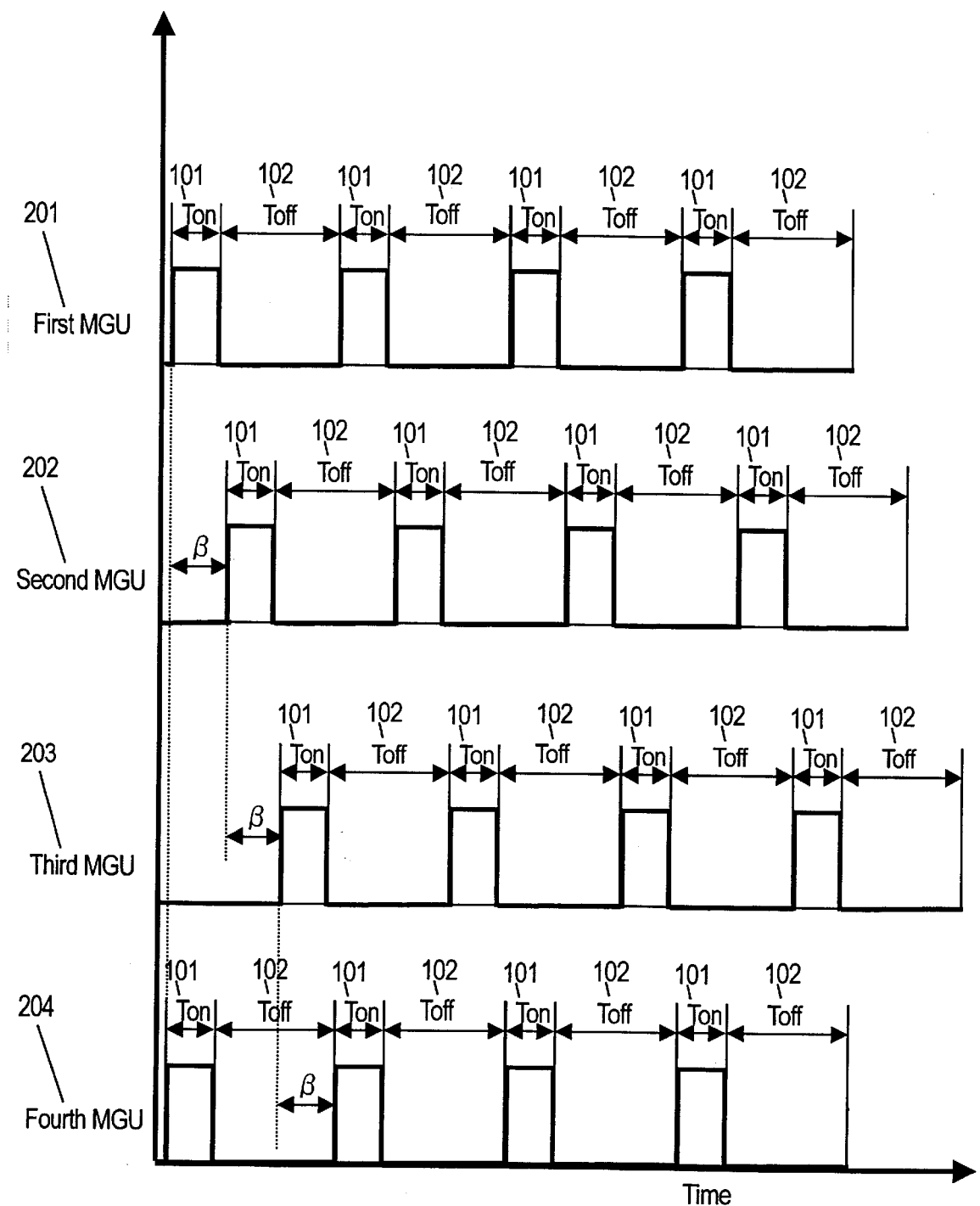
FIG. 5 is a diagram showing output timing in another example of microwave output of each microwave power source in the embodiment of the invention.

The phase difference of microwave output may be enough as far as the microwave outputs of the adjacent MGUs may not overlap, and as shown in FIG. 5, in the microwave outputs of MGU 201, MGU 202, MGU 203, and MGU 204, a phase difference β is provided individually. For example, as shown in FIG. 5, in the overlapped microwave OFF time of MGU 201, MGU 203, and MGU 204, the MGU 202 adjacent to MGU 201 and MGU 203 issues a microwave. Next, in the overlapped microwave OFF time of MGU 201, MGU 202, and MGU 204, the MGU 203 adjacent to MGU 202 and MGU 204 issues a microwave. Also, in the overlapped microwave OFF time of MGU 202 and MGU 203, the MGU 201 and MGU 204 adjacent to MGU 202 and MGU 203 issue microwaves. In this way, by keeping an appropriate phase difference in the microwave outputs of adjacent MGUs, mutual discharge interference in adjacent discharge areas 10 can be avoided. As a result, a stable laser beam is issued.

In the foregoing embodiment of the invention, the MGUs are described to be adjacent in an integral structure, but actually the waveguide for composing the MGUs are desired to be disposed to be adjacent to each other. The magnetron and power source are not required to be disposed adjacently to each other.

In the embodiment of the invention, the microwave output is described so as to be controlled by PWM in a specific off time, but, for example, in the case of two adjacent MGUs, while one is issuing a microwave, the other is not issuing a microwave. Next, at the timing when the busy (issuing) MGU stops the output of microwaves, the other MGU issues microwaves. Aside from such control, other control methods may be also employed.

A magnetron is used as the microwave generator, but other devices having a microwave function by semiconductors or other means may also be also used. The microwave power source may be selected so as to be suited to the above or to other microwave generating functions.

As evident from the description herein, in the MEGLO of the invention, since mutual discharge interference of adjacent discharge areas 10 can be avoided, a small-sized gas laser oscillator can produce a stable laser beam output.

What is claimed is:

1. A microwave excited gas laser oscillator comprising:
   a discharge tube containing a laser gas;
   a plurality of microwave generating units, each of said plurality of microwave generating units comprising:
      a microwave generator operable to generate microwaves,
      a power source operable to supply power to said microwave generator, and
      a waveguide coupling said microwave generator to a discharge area of said discharge tube and operable to inject the microwaves generated by said microwave generator into said discharge area to thereby discharge and excite the laser gas; and
   a controller operable to drive and control each of said plurality of microwave generating units, wherein said waveguides of said plurality of microwave generating units are connected along said discharge tube at discharge areas and said controller is operable to drive microwave generating units having waveguides that are connected along said discharge tube at adjacent discharge areas at a specific phase difference such that said microwave generating units having said waveguides that are connected along said discharge tube at adjacent discharge areas are not driven during a same time period.

2. A microwave excited gas laser oscillator according to claim 1, wherein said controller is operable to issue a reference clock to each of said plurality of microwave generating units to control a switching phase of a microwave generated by each of said plurality of microwave generating units.

3. A microwave excited gas laser oscillator according to claim 1, further comprising a phase shifter operable to control operation of said plurality of microwave generating units at the specific phase difference such that said microwave generating units having waveguides that are connected along said discharge tube at adjacent discharge areas are not driven during the same time period, wherein said phase shifter and said power sources of said plurality of microwave generating units are combined in one unit.

4. A microwave excited gas laser oscillator comprising:
 a plurality of microwave output units, each of said plurality of microwave output units comprising:
  a discharge tube containing a laser gas, and
  a plurality of microwave generating units, each of said plurality of microwave generating units comprising:
   a microwave generator operable to generate microwaves;
   a power source operable to supply power to said microwave generator; and
   a waveguide coupling said microwave generator to a discharge area of said discharge tube and operable to inject the microwaves generated by said microwave generator into said discharge area to thereby discharge and excite the laser gas; and
 a controller operable to drive and control each of said plurality of microwave generating units of said plurality of microwave output units, wherein said waveguides of each of said plurality of microwave generating units are connected along said discharge tube of each of said plurality of microwave output units, respectively, at discharge areas and said controller is operable to drive microwave generating units having waveguides that are connected to said discharge tube at adjacent discharge areas in each of said plurality of microwave output units at a specific phase difference such that said microwave generating units having said waveguides that are connected along said discharge tube at adjacent discharge areas in each of said plurality of microwave output units are not driven during a same time period.

5. A microwave excited gas laser oscillator according to claim 4, wherein said controller is operable to issue a reference clock to each of said plurality of microwave generating units to control a switching phase of a microwave generated by each of said plurality of microwave generating units.

6. A microwave excited gas laser oscillator according to claim 4, wherein each of said plurality of microwave output units further comprises a phase shifter operable to control operation of said plurality of microwave generating units of each of said plurality of microwave output units, respectively, at the specific phase difference such that said microwave generating units having waveguides that are connected along said discharge tube at adjacent discharge areas in each of said plurality of microwave output units are not driven during the same time period, wherein said phase shifter and said power sources of said plurality of microwave generating units are combined in one unit in each of said plurality of microwave output units.

* * * * *